United States Patent [19]

Ambrose et al.

[11] Patent Number: 4,535,132

[45] Date of Patent: Aug. 13, 1985

[54] THERMOSETTING HIGH SOLIDS SOLVENT-BASED POLYESTER POLYOL COATING COMPOSITIONS

[75] Inventors: Ronald R. Ambrose, Allison Park; Wen-Hsuan Chang, Gibsonia; David T. McKeough, Gibsonia; Delano R. Eslinger, Gibsonia; Samuel Porter, Jr., Natrona Heights, all of Pa.

[73] Assignee: PPG Industries, Inc., Pittsburgh, Pa.

[21] Appl. No.: 560,688

[22] Filed: Dec. 12, 1983

[51] Int. Cl.$^3$ .............................................. C08L 67/02
[52] U.S. Cl. ................................. 525/443; 525/437; 525/440; 525/442
[58] Field of Search ............... 525/442, 440, 443, 519, 525/480, 454, 437; 524/539

[56] References Cited

U.S. PATENT DOCUMENTS

| | | | |
|---|---|---|---|
| 3,668,276 | 6/1972 | Riemhofer et al. | 260/850 |
| 3,994,851 | 11/1976 | Chang | 525/443 |
| 4,316,940 | 2/1982 | Thornley | 428/413 |
| 4,332,701 | 6/1982 | Ponyik, Jr. et al. | 524/539 |
| 4,352,924 | 10/1982 | Wooten et al. | 528/302 |
| 4,405,764 | 9/1983 | Tobias et al. | 525/443 |
| 4,419,407 | 12/1983 | Piccirilli et al. | 525/440 |

*Primary Examiner*—Theodore E. Pertilla
*Attorney, Agent, or Firm*—Godfried R. Akorli

[57] ABSTRACT

This invention encompasses a high solids, solvent-based, thermosetting composition having the necessary hardness and flexibility that make it an effective coating for both elastomeric and metal substrates. The composition comprises a polyester polyol and a curing agent such as an aminoplast.

19 Claims, No Drawings

THERMOSETTING HIGH SOLIDS SOLVENT-BASED POLYESTER POLYOL COATING COMPOSITIONS

BACKGROUND OF THE INVENTION

1. Field of the Invention

The present invention relates to thermosetting, solvent-based resinous compositions. More specifically, the invention relates to thermosetting, solvent-based, high solids coatings comprising polyester polyols that are useful in coating both elastomeric and hard metal substrates.

2. Brief Description of the Prior Art

There are known in the art coating compositions that can be applied to elastomeric substrates. These coating compositions are characterized by excellent flexibility, particularly at low temperatures. An illustration of these coating compositions are those based on polyester-urethane polyols of relatively high molecular weight which are cured with aminoplasts. Another illustration of these coating compositions are those based on polymeric polyols such as soft polyurethane polyols cured with a stoichiometric excess of an aminoplast curing agent. Yet another illustration of these coating compositions are those based on thermosetting, hard polyester polyols, soft polyurethane polyols and aminoplast curing agents. It has been found that while these elastomeric coatings have a reasonable degree of hardness, they are not sufficiently hard to be used effectively on hard metal substrates.

Coating compositions that can be applied to hard metallic substrates are known in the art. These coating compositions are characterized by excellent hardness. An illustration of these coating compositions are those based on polyester polyols and acrylic polymers cured with aminoplasts or isocyanates. These coatings, generally, are not flexible enough to be used effectively on elastomeric parts.

In this state of the art, an article, with metallic and elastomeric parts, requires two types of coatings: one suitable for elastomeric parts and the other suitable for metallic parts. It would be recognized that a coating suitable for both metallic and elastomeric parts would be of a significant advantage in the coatings industry. Those skilled in the art would appreciate how difficult it is to prepare such coatings having, conjointly, the properties of flexibility, durability and hardness. It would be all the more difficult to prepare high solids compositions having the conjoint properties. This invention provides a high solids coating composition, the cured coating of which has, conjointly, excellent properties of flexibility, durability and hardness which make it useful on both elastomeric and hard metal parts.

SUMMARY OF THE INVENTION

In accordance with the foregoing, the present invention encompasses a high solids, solvent-based, thermosetting coating composition having a sprayability of at least 40 percent which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F.; and in that when the coating composition is deposited on a metallic substrate and cured, the coated substrate has a Sward hardness of at least 14; said coating composition contains a film-former comprising a polyester polyol and a curing agent; the polyester polyol has a hydroxyl value of at least 50 and comprises from about 10 to 35 percent cyclic moieties. The percent by weight is based on the total weight of the polyester.

The coating compositions of this invention are of high solids type, that is, they are sprayable at high solids content. The sprayability is the maximum concentration of solids at which the coating composition can be atomized sufficiently to form a uniformly deposited coating, under normal spraying conditions of, say, temperature, pressure, and spray equipment design such as entails the use of an air suction spray gun operating at 60 psi with a No. 30 air cap. This maximum concentration is solvent dependent and usually occurs in a viscosity range of 15-19 seconds with a No. 4 Ford cup at room temperature after thinning with a solvent such as a mixture of methyl amyl ketone and 2-ethoxyethylacetate. Above this maximum concentration, appearance, leveling and solvent popping typically become unacceptable. With the high solids, the desired coating thickness and appearance is obtained without enumerable coating applications. Additionally, coating compositions of this type meet air pollution standards which require a reduction of organic solvent emissions of today's organic solvent-based coating compositions.

In this context, by the term "thermosetting" is meant that the coating composition, upon heating, will solidify or set to form a coating which will not remelt on further heating.

The flexibility property of the coating can be determined by spray coating an elastomeric substrate and curing the coating at optimum conditions to give a dry film thickness of 1.5 to 2 mils. The elastomeric substrate is 1/16 to 3/16, typically ⅛-inch thick, thermoplastic polyurethane, such as commercially available from Mobay Company as TEXIN 355D. The coated substrate is bent around a ½-inch diameter mandrel with the coating side facing outward. After bending, the coating is examined for breaks and cracks. Testing can be conducted at temperatures such as room temperature, that is, 72°-77° F., or at lower temperatures. The lower temperatures can be obtained by cooling the substrate to standard temperatures of 45° F., 35° F., or 0° F. before bending. The lower the temperature, the more stringent the test. Preferably, the coating can withstand bending at 20° F., more preferably 0° F. The flexibility property of the coating is considered as good when there is no break in the coating or substantially no break, i.e., when the occurring break is not completely across the width of the substrate which is about 1 to 3 inches, at the measured temperature. It is noted that unlike the art-related compositions, plasticizers or the like are not needed to secure the flexibility property conjointly with the hardness property.

The hardness property of the coating composition can be determined by the Sward method using a Sward Rocker as described in ORGANIC COATING TECHNOLOGY, Payne, Vol. 1, 1965, pages 642–643. Testing is done on an optimally cured coating having a dry film thickness of 1½ to 2 mils over 20 gauge steel panels.

The hydroxyl value of the polyester-urethane polyol of the coating compositions is determined according to ASTM-E-222-76, Method B (reflux one hour). In the context of the foregoing, the invention is more fully described hereinbelow.

DETAILED DESCRIPTION OF THE INVENTION

The coating compositions of the present invention are high solids type, and have, conjointly, the properties of hardness and flexibility. Preferably, especially for automotive topcoat usage, the coating composition will be formulated to be weather durable. Weather durability can be predicted in certain instances by art-known accelerated tests.

The coating compositions are capable of producing cured coatings having a flexibility to withstand ½-inch mandrel bend at 35° F. (2° C.) and a Sward hardness of at least 14. The sprayability of the coating composition is at least 40 percent, preferably about 45 percent and more preferably about 55 percent by weight.

The flexibility and hardness properties are imparted to the coating composition by the acyclic and cyclic content of the polyester polyols present therein. By cyclic content is meant the weight percent of the ring component of the polyester polyol, e.g.,

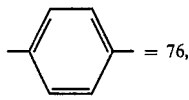 = 76, based on its total weight. By acyclic content is meant the weight percent of the component other than the aforedescribed cyclic moieties of the polyester polyol.

To impart the required flexibility, the reactants are selected on the basis that they provide acyclic moieties in the reaction product in an amount sufficient to provide a cured coating with a flexibility to withstand at least ½-inch mandrel bend at 35° F., preferably at 20° F. and more preferably at 0° F. Accordingly, the polyester polyol typically contains from about 65 to 90, and preferably from about 75 to 85 percent acyclic moieties.

To impart the required hardness, the reactants are selected on the basis that they provide cyclic moieties in the resultant polyester polyols in an amount sufficient to provide cured coatings with a Sward hardness of at least 14, preferably 18, and more preferably 30 or higher. Accordingly, the polyester polyol typically contains about 10 to 35, and preferably from about 15 to 25 percent cyclic moieties.

In the preferred embodiments, the coating compositions of the invention will be durable to weathering. Weather-durability is usually evaluated by outdoor exposure typically in areas such as the state of Florida in the United States of America. Preferably, coating compositions of the invention, when conventionally evaluated, will be able to withstand one-year exposure in Florida while maintaining an acceptable level, i.e., at least 30 percent of their distinct and desirable properties, e.g., initial gloss.

In the process of this invention, the polyester-polyol is prepared preferably by reacting an organic polycarboxylic acid or a functional equivalent thereof such as an anhydride or a lower alkyl ester, with an organic polyol. The organic polycarboxylic acid preferably contains cyclic moieties or acyclic, or a mixture thereof. Diacids are preferred, although higher functional polyacids can be used, preferably in admixture with the diacids. Non-limiting examples of the cyclic polycarboxylic acids or their functional equivalents are o-phthalic acid, isophthalic acid, terephthalic acid, o-hexahydrophthalic acid, m-hexahydrophthalic acid, p-hexahydrophthalic acid, tetrahydrophthalic acid or a hydrocarbyl-substituted hexahydrophthalic acid wherein the hydrocarbyl group can be alkyl, alkenyl or aryl group. Of these acids, the aliphatic one such as hexahydrophthalic acid or its anhydride is preferred. The acyclic polycarboxylic acids contain from at least 2, preferably about 2 to 20 carbon atoms. Examples thereof include succinic acid, glutaric acid, adipic acid, suberic acid and sebacic acid.

The polyols employed in the preparation of the polyester can be cyclic or acyclic, or a mixture thereof. Diols are preferred, although higher functional polyols such as triols can be used, preferably in admixture with the diols. Examples of the cyclic polyols are bisphenol A, hydrogenated bisphenol A, cyclohexanediol and cyclohexanedimethanol. Examples of the acyclic polyols are those containing, preferably, from about 2 to 18 carbon atoms. Non-limiting examples of the acyclic polyols are 2,2,4-trimethyl-1,3-pentanediol, 1,4-butanediol, neopentyl glycol, and 1,6-hexanediol. Preferably, the polyol contains neopentyl group branching such as derived from neopentyl glycol and 2,2-dimethyl-3-hydroxypropyl-2,2-dimethyl-3-hydroxypropionate. Typically, the polyester will contain from about 10 to 60, more preferably from about 15 to 40 percent by weight of the alcohol branched neopentyl groups. The percentage by weight is based on the weight of the polyol which contains the neopentyl branching divided by the total weight of the polyol ingredients which are used in preparing polyester polyols. Of the polyols useful herein, aliphatic polyols are preferred. While the use of diols is preferred herein, higher functionality polyols such as triols, e.g., trimethylolpropane, can be used, preferably in admixture with the diols. Controlled amounts of the higher functional polyols may be used to improve hardness of the cured coating provided that its flexibility is not adversely affected.

The reaction of the acid with the polyol is an esterification reaction which is well known in the art. In accordance with this invention, the resultant polyester polyol is hydroxyl-functional. It is of a low molecular weight, has a hydroxyl value of at least 50 and preferably about 150 to 350. Hydroxyl values lower than 50 are generally less preferred because of higher resin viscosities and the difficulties associated in formulating high solids coating compositions. Hydroxyl values much higher than 350 are generally less preferred because of insufficient flexibility in the resulting coating. The polyester polyols will preferably contain some residual acid groups, thus, they will have an acid value of up to 15.

Polyester polyols prepared by other methods and/or with other ingredients can also be used in this invention. For example, polyester polyols from lactones can be prepared by subjecting a lactone to polymerization in the presence of a low molecular weight polyol such as ethylene glycol, diethylene glycol, triethylene glycol, 1,4-butanediol, propylene glycol and cyclohexane dimethanol. This and other methods of preparing polyester polyols in accordance with this invention are hereby encompassed.

It is desired to point out that the acids and polyols described hereinabove can have substituents provided that the substituents do not adversely affect the reaction or utility of the resultant composition. The substituent can be a thio group, a halogen group, or the like. At any rate, the substituent would not be the basis for the basic properties of flexibility and hardness of the present invention. Hence, the coating compositions of this invention consist essentially of the polyester polyol and a curing agent.

In the practice of the invention, the polyester polyol is employed in combination with curing agent which is capable of reacting with the active hydrogens in the polyester polyol to give a thermosetting coating. Examples of curing agents are aminoplasts and polyisocyanates including blocked isocyanates. Usually, a cure catalyst is employed therewith. The polyester polyol and the curing agent provide the major ingredients of the coating composition.

Aminoplast condensates are obtained from the reaction of formaldehyde with an amine or an amide. The most common and preferred amines or amides are melamine, urea or benzoguanamine. However, condensates with other amines and amides can be employed, for example, aldehyde condensates or diazines, triazoles, guanidines, guanamines and alkyl and aryl disubstituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol. The cure catalysts usually employed are dodecylbenzene sulfonic acid, para-toluene sulfonic acid and butyl stannoic acid.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Mobay Chemical as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application. The cure catalyst used therewith can be metal salts or complexes, e.g., dibutyltin dilaurate, acetyl acetonate; quaternary compounds such as quaternary ammonium or phosphonium, and the like.

The amounts of polyester polyol and curing agent which are used in the practice of the invention are preferably adjusted so that the weight ratio of polyester polyol:curing agent is within the range of 6 to 0.5:1, preferably 3 to 1.5:1, and more preferably 3 to 1.8:1. Ratios of polyester polyol:curing agent greater than 6:1 are not preferred because hardness and durability of the resultant coating will suffer; whereas ratios less than 0.5:1 are not preferred because flexibility of the resultant coating will suffer.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone, alcohols such as isopropyl alcohol, normal-butyl alcohol, monoethers of glycols such as the monoethers of ethylene glycol and diethylene glycol, monoether glycol acetates such as 2-ethoxyethyl acetate, as well as compatible mixtures thereof. The diluent is present in amounts up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants and other formulating additives can be employed if desired. These materials are optional and generally constitute up to about 10 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates, elastomeric parts, plastics, and on metal surfaces such as steel and aluminum. In accordance with this invention, the same coating composition can be used to coat an article having elastomeric and metallic parts. Hence, automobiles, for example, can be assembled and painted with the same coating in accordance with this invention. Since the same coating is employed, it is relatively easier to obtain color matching.

The combination of outstanding properties of the coating compositions of the present invention make them useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thickness will vary depending upon the application desired. In general, coatings from about 0.5 to 3 mils have been found to be useful in most applications.

After application to the substrate, the coatings are cured. Curing is usually conducted at temperatures of about 100° to 200° C., and in most cases, a cure schedule is from about 20 to 30 minutes at about 120° to 150° C. Higher or lower temperatures with correspondingly shorter or longer times can be utilized, although the exact cure schedule best employed depends upon the nature of the substrate as well as the particular components used in formulating the coating compositions.

The coating compositions of the present invention can be applied to the substrate in a clear-over-color application in which a pigmented or colored base coat is first applied to a substrate, followed by application of a clear top coat.

The following examples illustrate the invention. All quantities are on a weight basis unless otherwise indicated.

EXAMPLE 1

Part 1

This example illustrates the high solids compositions comprising a polyester polyol, and the methods of preparing and using same. First, the polyester-polyol composition was prepared, as follows:

| Ingredients | Parts by Weight (grams) |
| --- | --- |
| Neopentyl glycol | 4265.98 |
| 1,6-Hexanediol | 4840.25 |
| Sebacic acid | 1657.17 |
| Hexahydrophthalic anhydride | 1263.38 |
| Isophthalic acid | 4971.51 |
| Butyl stannoic acid (catalyst) | 1.7 |

The above ingredients with the exception of the catalyst were charged to a properly equipped reaction vessel and the resultant mixture heated to react in a nitrogen atmosphere. At 70° C., the catalyst was added. At 160° C., there resulted the production of water of (esterification) reaction. With the continuous removal of the water, heating was continued to 100° C. The reaction mixture was then held over a range of 190° to 200° C. for about 10 hours until an acid value of about 7.6 was attained. The resultant mixture was then cooled to a temperature of about 68° C., and thinned with methylisobutyl ketone, discharged and analyzed.

Analysis: Theoretical solids content was 90 percent, acid value was 7.6, viscosity was 12.31 stokes and hydroxyl value was 229.9.

Part 2

A high solids, thermosetting, pigmented coating composition (white) was prepared with the above polyester polyol, as follows. The polyester polyol was formulated with an aminoplast curing agent and other ingredients listed below.

| Ingredients | Parts by Weight (grams) | Resin Solids |
| --- | --- | --- |
| The polyester polyol composition | 52.2 | 47 |
| Melamine[1] | 30 | 30 |
| Polymeric microparticle[2] | 4.55 | 2 |
| Cellulose acetate butyrate | 4.0 | 1 |
| U.V. absorber[3] | 2 | 1 |
| U.V. stabilizer[4] | 2 | 1 |
| Dodecyl benzene sulfonic acid | 1.15 | — |
| Thinning solvent[5] | 57.3 | — |
| Pigment Paste[6] | 111.1 | 20 |

[1]RESIMENE 745 available from Monsanto Company.
[2]Prepared in essentially the same manner as described in Example II of U.S. Pat. No. 4,147,688.
[3]Available from Ciba-Geigy Company as TINUVIN.
[4]Available from Ciba-Geigy Company as TINUVIN.
[5]Methyl amyl ketone/Cellosolve acetate.
[6]Titanium dioxide (66.6 grams pigment solids), ground with a polymeric grinding vehicle comprising a compatable polyester resin.

The coating composition, with a pigment to binder weight ratio of 1:1.5, had a sprayable resin solids content of 65 percent by weight. This coating composition was sprayed on a ⅛-inch thick thermoplastic polyurethane commercially available from Mobay as TEXIN 355D and on a metal substrate. The obtained films were baked at 250° F. (121° C.) for 30 minutes and then subjected to hardness and flexibility tests with the following results: The coated substrates exhibited Sward hardness of 36, and withstood a ½-inch mandrel test at 20° F. without a substantial break.

EXAMPLE 2

This example illustrates the high solids compositions comprising a polyester polyol, and the method of preparing same. First, the polyester-polyol composition was prepared, as follows:

| Ingredients | Parts by Weight (grams) |
| --- | --- |
| 1,6-Hexanediol | 1006 |
| Neopentyl glycol | 444.0 |
| Cyclohexanedimethanol | 614 |
| Hexahydrophthalic anhydride | 919 |
| Sebacic acid | 517 |
| Butyl stannoic acid | 0.35 |

The method of preparation was essentially the same as described in Example 1, part 1.

Analysis of the resultant composition was as follows: Theoretical solids content was 90 percent, viscosity (stokes) was 5.83, acid value was 9.1 and hydroxyl value was 264.8.

A high solids, thermosetting, pigmented coating composition (white) was prepared with the above polyester polyol. The polyester polyol was formulated with 30 percent aminoplast curing agent, and other ingredients which were essentially the same as listed in Example 1, part 2.

The coating composition, with a pigment to binder weight ratio of 1:1.5, had a sprayable resin solids content of 66 percent by weight. This coating composition was sprayed on a ⅛-inch thick thermoplastic polyurethane commercially available from Mobay as TEXIN 355D and on a metal substrate. The obtained films were baked at 250° F. (121° C.) for 30 minutes and then subjected to hardness and flexibility tests with the following results: The coated substrates exhibited Sward hardness of 20, and withstood a ½-inch mandrel test at 20° F. without a substantial break.

EXAMPLE 3

This example illustrates the high solids compositions comprising a polyester polyol, and the method of preparing same. First, the polyester-polyol composition was prepared, as follows:

| Ingredients | Parts by Weight (grams) |
| --- | --- |
| 1,6-Hexanediol | 1024 |
| Neopentyl glycol | 903 |
| Hexahydrophthalic anhydride | 267 |
| Adipic acid | 254 |
| Isophthalic acid | 1052 |
| Butyl stannoic acid | 0.35 |

The method of preparation was essentially the same as described in Example 1, part 1.

Analysis of the resultant composition was as follows: Theoretical solids content was 90 percent, viscosity (stokes) was 11.83, acid value was 7.2 and hydroxyl value was 238.7.

A high solids, thermosetting, pigmented coating composition (white) was prepared with the above polyester polyol and used, as follows. The polyester polyol was formulated with 30 percent aminoplast curing agent and other ingredients which were essentially the same as listed in Example 1, part 2.

The coating composition, with a pigment to binder weight ratio of 1:1.5, had a sprayable resin solids content of 65 percent by weight. This coating composition was sprayed on a ⅛-inch thick thermoplastic polyurethane commercially available from Mobay as TEXIN 355D and on a metal substrate. The obtained films were baked at 250° F. (121° C.) for 30 minutes and then subjected to hardness and flexibility tests with the following results: The coated substrates exhibited Sward hardness of 24, and withstood a ½-inch mandrel test at 20° F. without a substantial break.

EXAMPLE 4

This example illustrates the high solids compositions comprising a polyester polyol, and the methods of preparing and using same. First, the polyester-polyol composition was prepared, as follows:

| Ingredients | Parts by Weight (grams) |
| --- | --- |
| Hexahydrophthalic anhydride | 7165.2 |
| 1,6-Hexanediol | 5493 |
| Neopentyl glycol | 4841.6 |

The method of preparation was essentially the same as described in Example 1, Part 1.

Analysis: Theoretical solids content was 100 percent, viscosity was 7.18 stokes, acid value was 9.5 and hydroxyl value was 271.5.

A high solids, thermosetting coating composition was prepared with the above polyester polyol, as follows.

| Ingredients | Parts by Weight (grams) | Resin Solids |
| --- | --- | --- |
| The polyester polyol composition | 56.0 | 50.4 |
| Melamine[1] | 30.0 | 30.0 |
| Polymeric microparticle[2] | 5.55 | 2.45 |
| Cellulose acetate butyrate | 4.0 | 1.0 |
| U.V. absorber[3] | 2.0 | 2.0 |
| U.V. stabilizer[4] | 1.0 | 0.5 |
| Dodecyl benzene sulfonic acid | 1.88 | 0.75 |
| Thinning solvent[5] | 43.1 | — |
| Pigment paste[6] | 89.75 | 16.15 |

[1]RESIMENE 745, available from Monsanto.
[2]Prepared in essentially the same manner as described in Example II of U.S. Pat. No. 4,147,688.
[3]Available from Ciba-Geigy Company as TINUVIN.
[4]Available from Ciba-Geigy Company as TINUVIN.
[5]Methyl amyl ketone/Cellosolve acetate.
[6]Titanium dioxide (40 grams pigment solids), ground with a polymeric grinding vehicle comprising a compatible polyester resin.

The coating composition had a sprayable resin solids content of 50 percent by weight. This coating composition was sprayed on a ⅛-inch thick thermoplastic polyurethane commercially available from Mobay as TEXIN 355D, and on a metal substrate. The obtained films were baked at 250° F. (121° C.) for 30 minutes and then subjected to hardness and flexibility tests with the following results: The coated substrates exhibited Sward hardness of 28, and withstood a ½-inch mandrel test at 20° F. without a substantial break.

We claim:

1. A high solids, solvent-based, thermosetting coating composition having a sprayability of at least 40 percent which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F.; and in that when the coating composition is deposited on a metallic substrate and cured, the coated substrate has a Sward hardness of at least 14; said coating composition contains a film-former consisting essentially of a polyester polyol and a curing agent; the polyester polyol has a hydroxyl value of at least 50 and comprises from about 10 to 35 percent cyclic moieties.

2. A composition of claim 1, wherein the polyester polyol has a hydroxyl value of 150 to 350.

3. A composition of claim 1, wherein the polyester polyol contains from about 15 to 25 percent cyclic moieties.

4. A composition of claim 1, wherein the curing agent is an isocyanate, a blocked isocyanate, an aminoplast or phenoplast.

5. A composition of claim 4, wherein the curing agent is an aminoplast.

6. A composition of claim 1, wherein the polyester polyol is prepared by reacting an organic polycarboxylic acid with a polyol.

7. A composition of claim 6, wherein the organic polycarboxylic acid is a dicarboxylic acid or a derivative thereof or a mixture of dicarboxylic acids and the polyol is a diol or a mixture of diols.

8. A composition of claim 7, wherein the organic dicarboxylic acid or the derivative thereof contains cyclic groups.

9. The composition of claim 7, wherein the organic dicarboxylic acid is selected from the class consisting of o-phthalic, isophthalic, terephthalic, o-hexahydrophthalic, p-hexahydrophthalic, m-hexahydrophthalic, tetrahydrophthalic, hydrocarbyl-substituted hexahydrophthalic acid and a derivative thereof, wherein the hydrocarbyl group is an alkyl, alkenyl or aryl group.

10. A composition of claim 8, wherein the organic dicarboxylic acid is aliphatic and is selected from the group consisting of hexahydrophthalic acid, methyl hexahydrophthalic acid and an anhydride thereof.

11. A composition of claim 7, wherein the diol or a mixture of diols is aliphatic.

12. The composition of claim 11, wherein the mixture of diols is of straight chain diols containing from 2 to 20 carbon atoms and a diol containing neopentyl group branching.

13. A composition of claim 6 in which the equivalent ratio of polyol to polycarboxylic acid is about 2:1.

14. A high solids, solvent-based, thermosetting composition having a sprayability of at least 40 percent which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F. and in that when the coating composition is deposited on a metallic substrate and cured, the coated substrate has a Sward hardness of at least 14; said coating composition contains a film-former consisting essentially of a polyester polyol and a curing agent; the polyester polyol has a hydroxyl value of at least 50 and is prepared by reacting:
  (a) hexahydrophthalic acid, alkyl-substituted hexahydrophthalic acid, hexahydrophthalic anhydride or alkyl substituted hexahydrophthalic anhydride with
  (b) a mixture of diols comprising:
    (i) a straight chain diol containing from 2 to 20 carbon atoms,
    (ii) a diol containing neopentyl group branching;
  said polyester polyol containing 15 to 25 percent by weight cyclic moieties.

15. A composition of claim 14, wherein (a) is a mixture of hexahydrophthalic anhydride, isophthalic acid, and sebacic acid.

16. A composition of claim 14, wherein the diol containing the neopentyl groups is neopentyl glycol.

17. A composition of claim 14, wherein the straight chain diol is 1,6-hexanediol.

18. A composition of claim 14, wherein the equivalent ratio of diol to diacid is about 2:1.

19. A composition of claim 5, wherein the weight ratio of the polyester polyol to the aminoplast curing agent is 3 to 1.5:1.

* * * * *